(12) United States Patent
Huber et al.

(10) Patent No.: US 11,235,798 B2
(45) Date of Patent: Feb. 1, 2022

(54) ADJUSTING DRIVE FOR A STEERING COLUMN AND STEERING COLUMN FOR A MOTOR VEHICLE

(71) Applicants: thyssenkrupp Presta AG, Eschen (LI); thyssenkrupp AG, Essen (DE)

(72) Inventors: Sebastian Huber, Göfis (AT); Jean-Pierre Specht, Haag (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 0 days.

(21) Appl. No.: 17/263,414

(22) PCT Filed: Jul. 26, 2019

(86) PCT No.: PCT/EP2019/070144
§ 371 (c)(1),
(2) Date: Jan. 26, 2021

(87) PCT Pub. No.: WO2020/025465
PCT Pub. Date: Feb. 6, 2020

(65) Prior Publication Data
US 2021/0309277 A1     Oct. 7, 2021

(30) Foreign Application Priority Data

Jul. 30, 2018   (DE) ..................... 10 2018 212 696.8

(51) Int. Cl.
*B62D 1/181*   (2006.01)
*F16H 25/20*   (2006.01)

(52) U.S. Cl.
CPC ......... *B62D 1/181* (2013.01); *F16H 25/2015* (2013.01); *F16H 25/2025* (2013.01);
(Continued)

(58) Field of Classification Search
CPC . B62D 1/181; F16H 25/2015; F16H 25/2025; F16H 2025/2084; F16H 2025/209; F16H 2025/2059
See application file for complete search history.

(56) References Cited

U.S. PATENT DOCUMENTS 2,769,351 A   11/1956  Serfling
2007/0137381 A1  6/2007  Arihara
(Continued)

FOREIGN PATENT DOCUMENTS

DE   10 2014 103 879 A   9/2015
DE   10 2015 224 602 A   6/2017
DE   10 2017 207 561 A   7/2017

OTHER PUBLICATIONS

English Translation of International Search Report issued in PCT/EP2019/070144, dated Nov. 28, 2019.
(Continued)

*Primary Examiner* — William Kelleher
*Assistant Examiner* — Gregory T Prather
(74) *Attorney, Agent, or Firm* — thyssenkrupp North America, LLC

(57) ABSTRACT

An adjusting drive for a motor-adjustable steering column for a motor vehicle, includes a motorized drive unit and an external threaded spindle which has an external thread and a coaxial internal thread into which an internal threaded spindle engages. The external threaded spindle and the internal threaded spindle can be driven in rotation relative to one another about an axis by the drive unit. In order to provide an adjusting drive which requires a reduced drive torque and delivers an optimized free adjustment path, the external threaded spindle engages with its external thread in a drive nut, wherein the drive nut or the internal threaded spindle is able to be driven in rotation by the drive unit and
(Continued)

is supported relative to the drive unit in the direction of the axis.

14 Claims, 4 Drawing Sheets

(52) U.S. Cl.
CPC ............... *F16H 2025/209* (2013.01); *F16H 2025/2059* (2013.01); *F16H 2025/2084* (2013.01)

(56) References Cited

U.S. PATENT DOCUMENTS

| | | | |
|---|---|---|---|
| 2009/0100956 A1* | 4/2009 | Warashina | B62D 1/181 |
| | | | 74/493 |
| 2013/0292509 A1* | 11/2013 | Russ | B64D 41/007 |
| | | | 244/58 |
| 2015/0175392 A1* | 6/2015 | Soltermann | F16H 25/2056 |
| | | | 74/89.34 |
| 2016/0108911 A1* | 4/2016 | Sprocq | F16H 25/186 |
| | | | 418/205 |
| 2017/0097071 A1 | 4/2017 | Galehr | |
| 2017/0137381 A1 | 5/2017 | Brüjes | |
| 2017/0248210 A1* | 8/2017 | Muller | E05F 15/622 |
| 2019/0301574 A1* | 10/2019 | Terada | B62D 7/224 |

OTHER PUBLICATIONS

Wikipedia, ISO metric screw thread, https://en.wikipedia.org/wiki/ISO_metric_screw_thread, (Accessed Dec. 2, 2020).

* cited by examiner

ADJUSTING DRIVE FOR A STEERING COLUMN AND STEERING COLUMN FOR A MOTOR VEHICLE

CROSS REFERENCE TO RELATED APPLICATIONS

This application is a U.S. National Stage Entry of International Patent Application Serial Number PCT/EP2019/070144, filed Jul. 26, 2019, which claims priority to German Patent Application No. DE 10 2018 212 696.8, filed Jul. 30, 2018, the entire contents of both of which are incorporated herein by reference.

FIELD

The present disclosure generally relates to an adjusting drive for a motor-adjustable steering column for a motor vehicle.

BACKGROUND

Steering columns for motor vehicles have a steering shaft with a steering spindle, a steering wheel for introducing a steering command by the driver being attached to the rear end thereof facing the driver in the direction of travel. The steering spindle is rotatably mounted about its longitudinal axis in a casing tube of an actuating unit which is held by a support unit on the vehicle body. As the actuating unit has at least one casing tube which is displaceable telescopically in the direction of the longitudinal axis in a casing unit, which is connected to the support unit and which is also denoted as a guide box or boxed swing arm, a longitudinal adjustment of the steering wheel may be carried out relative to the vehicle body. A vertical adjustment may be implemented by the actuating unit or a casing unit receiving this actuating unit being pivotably mounted on the support unit. The adjustment of the actuating unit in the longitudinal and/or vertical direction permits the setting of an ergonomically comfortable steering wheel position relative to the driver's position in the operating position, also denoted as the driving or operating position, in which a manual steering operation may be carried out.

In the case of motor-adjustable steering columns, it is known to provide for the adjustment a motorized adjusting drive with a drive unit which comprises an electrical drive motor which drives a spindle drive with a threaded spindle screwed into a spindle nut. By means of the drive unit, the threaded spindle and the spindle nut may be driven in rotation relative to one another about the threaded spindle axis, or in short the spindle axis, whereby depending on the rotational direction the threaded spindle and the spindle nut may be moved in a translational manner toward one another or away from one another in the direction of the threaded spindle axis. The threaded spindle and the spindle nut are supported in the direction of the spindle axis on parts of the steering column which are adjustable relative to one another, for example on a casing unit and a support unit or on casing tubes of a casing unit which are telescopable in the axial direction.

In an embodiment known as a plunger spindle drive, relative to a rotation about the spindle axis the threaded spindle is coupled in a non-rotational manner to a fixed part of the steering column, for example of the support unit, the casing unit or a casing tube, and the spindle nut is able to be rotatably driven but is supported in the direction of the spindle axis on a part of the steering column which is adjustable relative thereto. By the rotating drive of the spindle nut a translational movement may be effected relative to the threaded spindle, whereby the parts of the steering column which are connected via the spindle drive may be adjusted relative to one another. A steering column with such an adjusting drive is disclosed, for example, in DE 10 2017 207 561 A1.

Alternatively, in an embodiment known as a rotary spindle drive, the threaded spindle may be rotatably driven relative to the steering column and the spindle nut may be fixed relative to rotation about the spindle axis.

The maximum adjustment path which is able to be implemented in a simple rotary drive or spindle drive is defined by the length of the threaded spindle. In order to be able to implement greater adjustments, for example in autonomous driving mode in order to stow the steering wheel outside the manual operating region, correspondingly long threaded spindles are required. In order to overcome this limitation, in DE 10 2015 224 602 A1 a telescopically nested arrangement of two spindle drives has been proposed. In this case, a first and/or external threaded spindle, denoted hereinafter as the external threaded spindle, is supported fixedly on the drive unit axially in the direction of the spindle axis and may be driven in rotation. A first spindle drive which is configured as rotary spindle drive is formed by a guide piece which is screwed onto the external threaded spindle and which is connected to a steering column component to be adjusted. The external threaded spindle is configured as a hollow spindle with an internal thread into which an internal threaded spindle engages, said internal threaded spindle being supported fixedly in terms of rotation relative to the guide piece and to the external threaded spindle. As a result, a second spindle drive which is configured as plunger spindle drive and which is forcibly coupled to the first spindle drive is formed. This means that in each adjusted state both spindle drives are always rotatably driven at the same time by the drive unit. In order to overcome the resulting relatively high frictional and inertial forces of both spindle drives during the adjustment, the motorized adjusting drive has to deliver a correspondingly high drive torque and to be of relatively large dimensions which leads to a large constructional space requirement and weight. Moreover, as the external threaded spindle is fixedly supported on the drive unit in the direction of the spindle axis, the usable free adjustment path, measured from the drive unit to the free end of the internal threaded spindle, is limited downwardly by the length of the external threaded spindle. The free end of the internal threaded spindle may only be brought closer to the drive unit up to the free end of the external threaded spindle.

Thus, a need exists to provide an adjusting drive which requires a reduced drive torque and delivers an optimized free adjustment path.

DETAILED DESCRIPTION

Figure 1:
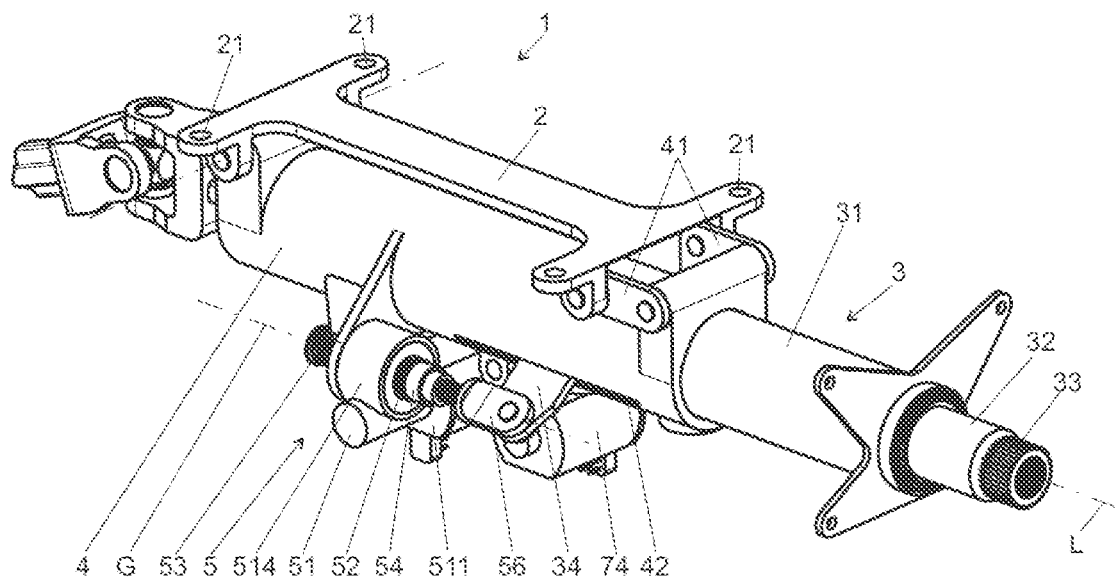
FIG. 1 is a schematic perspective view of a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to an adjusting drive for a motor-adjustable steering column for a motor vehicle, comprising a motorized drive unit and an external threaded spindle which has an external thread and a coaxial internal thread into which an internal threaded spindle engages, wherein the external threaded spindle and the internal threaded spindle are able to be driven in rotation relative to one another about an axis by the drive unit. Moreover, a motor-adjustable steering column forms the subject matter of the invention.

According to the invention, for an adjusting drive of the type mentioned in the introduction it is proposed that the external threaded spindle engages with its external thread in a drive nut, wherein the drive nut is able to be driven in rotation by the drive unit and is supported relative to the drive unit in the direction of the axis.

The external threaded spindle is at least partially configured as a hollow spindle, preferably configured to be hollow throughout its entire length in the axial direction. The internal thread is arranged coaxially internally in the through-opening. The internal threaded spindle engaging in the internal thread may at least partially penetrate axially into the external threaded spindle.

A first spindle drive which may be operated in a first operating mode as a plunger spindle drive is formed by the drive nut, also denoted as the drive spindle nut, and the ex-ternal threaded spindle. In this case, the external threaded spindle is moved by the rotating drive of the drive nut in a linear manner in the direction of the axis, i.e. the spindle axis, depending on the rotational direction in a translational manner relative to the drive nut which is supported relative to the drive unit in the direction of the axis. For setting the shortest adjustment position, the external threaded spindle may penetrate axially with its drive-side end through the drive nut, whereby its end on the adjustment side, remote from the drive unit, to which a connecting element is connected for acting on a part of the steering column to be adjusted, may be moved at a shortest distance as far as the vicinity of the drive nut and/or the drive unit. In other words, the external threaded spindle may be immersed in the drive unit in the direction of the axis. In the invention, the shortest distance achievable thereby is shorter than the length of the external threaded spindle, in contrast to the prior art in which the shortest distance is fixedly predetermined by the length of the ex-ternal threaded spindle which is fixedly supported on the drive unit in the direction of the axis and may not be fallen below. The usable free adjustment path may be advantageously increased thereby. By the external threaded spindle according to the invention which may be immersed relative to the drive unit, the available constructional space may be better used, whereby more flexible installation options may be implemented.

An advantage when used in stowable steering columns results when an adjusting drive according to the invention is used for the longitudinal adjustment, wherein the drive unit is supported in the direction of the steering column axis on the vehicle body. In the stowed position the external threaded spindle may be moved further out of the operating region of the passenger compartment in the direction of the axis in the longitudinal direction of the steering column than in the prior art, in which even in the case of maximum shortening the external threaded spindle protrudes over its entire length from the drive unit into the passenger compartment.

As the drive nut may be set in rotation by the drive unit relative to the external threaded spindle, a relative movement in the direction of the axis is possible without a simultaneous relative rotation of the external threaded spindle and the internal threaded spindle having to take place. The internal threaded spindle, which has a connecting element for connecting to the part of the steering column to be moved, is entrained with the linear movement of the external threaded spindle in the direction of the axis. As a result, the drive device initially only has to drive the first spindle drive formed from the drive nut and the external threaded spindle. This results in the advantage that reduced drive power is required than in the prior art, in which the second spindle drive formed between the internal and external threaded spindle is forcibly coupled and in each adjusted state is driven together with the first spindle drive. As a result, by means of the invention the drive unit may be of smaller dimensions and more lightweight.

In the described generation of the linear movement of the external threaded spindle relative to the drive unit, the external threaded spindle and the drive nut cooperate as a plunger spindle drive. This functionality may be denoted as the plunger spindle mode. The internal threaded spindle screwed into the thread of the external threaded spindle is entrained therewith in a linear manner in the direction of the axis. In order to generate a relative linear movement between the internal and external threaded spindle—if required —these internal and external threaded spindles may be driven in rotation relative to one another.

An advantageous development of the invention provides that a coupling device is configured between the external threaded spindle and the drive unit, for the releasable rotationally fixed coupling of the external threaded spindle to the drive nut. The coupling device is releasably designed and may optionally be moved into an activated coupling state in which the drive nut is coupled fixedly in terms of rotation to the external threaded spindle, or into a deactivated released state in which the above-described plunger spindle mode between the drive nut and external threaded spindle is active. In the released state the first spindle drive in the above-described plunger spindle mode is active. In the activated coupling state the plunger spindle mode of the first spindle drive is deactivated and the external threaded spindle, together with the drive nut, may be driven in rotation about the axis by the drive unit. As a result, the coaxial internal thread of the external threaded spindle may be set in rotation relative to the internal threaded spindle so that the second spindle drive formed by the internal thread and the internal threaded spindle engaging therein is activated and correspondingly a relative linear movement between the internal threaded spindle and the external threaded spindle may be generated. Then the internal threaded spindle cooperates with the internal thread of the external threaded spindle in the plunger spindle mode.

By means of the coupling device optionally the drive torque output by the drive device may be introduced into the first or the second spindle drive. Since in each case only one of the spindle drives is actively coupled-in, the drive power of the drive device may be lower than in the prior art in which both spindle drives are always active.

An advantageous embodiment provides that the coupling device has at least one stop element which is fixedly attached to the external threaded spindle and which is able to be supported in the direction of the axis, i.e. axially against the drive unit. The stop element may be configured as a collar or projection protruding externally over the external thread of the external threaded spindle. The stop element forms an end stop which, for a given rotational direction of the drive, blocks a further screwing of the external threaded spindle into the drive nut, as soon as it strikes against the drive unit in the direction of the axis, for example comes to lie against the drive nut on the front face. As a result, a further relative rotation is blocked and in the case of a further rotating drive the external threaded spindle rotates together with the drive nut so that the external threaded spindle and the internal threaded spindle are driven in rotation relative to one another about an axis and the internal threaded spindle is displaced and/or translationally moved relative to the external threaded spindle in the direction of the axis. The external threaded spindle thus acts with its internal thread as a spindle nut into which the internal threaded spindle engages. It is advantageous if a stop element may be implemented with little effort and the coupling or release of the drive nut and external threaded spindle takes place automatically without additional moveable elements, but merely by the relative linear movement.

Preferably, a stop element may be configured in an end region externally on the external threaded spindle and may be supported against the drive nut. As the stop element is configured as a collar, a wholly or partially circulating projection or shoulder, it limits a further screwing of the external thread of the external threaded spindle into the drive nut in the stop position. The stop element may be configured with the threaded spindle as a one-piece integral component. Alternatively the stop element may be fastened to the threaded spindle by a reshaping operation. Particularly preferably, the stop element is configured as a sleeve or disk which is fixed to the threaded spindle and/or produced by reshaping the threaded spindle.

It is advantageous that one respective stop element is arranged in the drive-side end region facing the drive unit and in the adjustment-side free end region of the external threaded spindle facing away from the drive unit. When extending the first outer spindle drive by a linear movement of the external threaded spindle out of the drive unit, the drive-side stop element may strike the drive wheel. As a result, the coupling device is activated and in the case of the following further rotation the external threaded spindle is rotatably entrained and the internal threaded spindle of the second inner spindle drive, which is rotationally fixed relative thereto and engages in the internal thread, is moved in a linear manner out of the external threaded spindle, i.e. extended so as to be oriented away from the drive nut. In contrast, for the retraction, the drive nut is rotated by the drive unit in the opposite direction relative to the external threaded spindle. As a result, the drive-side stop element is released from the stop position and the coupling device released. As a result, by the rotation of the drive nut, the external threaded spindle is moved in a linear manner toward the drive unit. The drive-side stop element is moved away from the drive nut in the direction of the axis in a linear manner until the other stop element on the adjustment side lies against the drive nut. As a result, the external threaded spindle is again coupled to the drive nut and rotated in the rotational direction opposing the extension. As a result, the second inner spindle drive is activated and the internal threaded spindle is retracted in the direction of the drive unit into the external threaded spindle in a linear manner.

The switching between the first outer spindle drive and the second inner spindle drive may be implemented in a reliable manner by a coupling device constructed in a mechanically simple manner with mechanical stop elements. The structure is robust and low in maintenance.

The internal thread may be configured in one piece with the external threaded spindle. As a result, a structure which is able to be produced in a simple manner and which is lightweight may be implemented.

Alternatively, the internal thread may be configured in a threaded piece which is connected to the external threaded spindle. The threaded piece forms a spindle nut for the internal threaded spindle. It may be produced from a material which is different from the material of the external threaded spindle, which regarding the material pairing is advantageous in a spindle drive with the internal threaded spindle preferably consisting of steel, such as for example a non-ferrous metal or plastics. The external threaded spindle may also consist of steel and at least the thread of the drive nut may also consist of non-ferrous metal or plastics. As a result, the spindle drives may be optimized to be freely-running, smooth-running and with little wear.

An advantageous development is that the threaded piece has a coupling device. The threaded piece may be attached fixedly in terms of rotation and in a pull-proof manner to one end of the external threaded spindle. For example, the threaded piece may be fixed externally to the external thread with a tubular or sleeve-shaped attachment which has a stop element of a coupling device, such as for example an externally protruding projection or collar. The connection of the threaded piece may take place, for example, by pressing onto the external threaded spindle, wherein additionally interlocking plastic deformations may be generated in order to form a positive and/or non-positive connection in the rotational direction and in the direction of the axis.

A connecting element may be arranged at the free end of the internal threaded spindle facing away from the external threaded spindle, and on the drive unit, for connecting the adjusting drive to a steering column of a motor vehicle or for connecting to the body of the motor vehicle. For implementing a longitudinal adjustment, for example, the drive unit may be connected to a casing unit, and the internal threaded spindle may be connected to a casing tube which is adjustable telescopically relative to the casing unit in the direction of the steering spindle axis. The spindle axis and the steering column axis thus run substantially parallel to one another.

A connecting element may comprise, for example, an articulated head with a connecting opening passing through transversely to the spindle axis. Alternatively or additionally, connecting elements of releasable or non-releasable fastening arrangements may be provided, for example non-positive or positive connecting elements.

The external threaded spindle and the internal threaded spindle may have equal thread pitches. As a result, with a predetermined rotational speed of the drive nut by the drive unit, the outer spindle drive formed by the drive nut and the external threaded spindle and the inner spindle drive formed by the internal thread and the internal threaded spindle may be retracted and extended at consistently the same speed in a linear manner in the direction of the axis.

Alternatively, it is conceivable and possible that the external threaded spindle and the internal threaded spindle have different thread pitches. For a given rotational speed of the drive, different linear movement speeds of the two spindle drives may be implemented. For example, by means of a spindle drive with a larger thread pitch the steering column may be rapidly moved from or into the stowed position whilst the other spindle drive with a smaller thread pitch may be used for a slower fine adjustment. It is also possible to use a smaller thread pitch for generating a larger force transmission if a larger linear actuating force should be required for specific adjustments.

It may be provided that the first spindle drive formed by the drive nut and the external threaded spindle and/or the second spindle drive formed by the external threaded spindle and the internal threaded spindle are configured to be self-locking. A self-locking configuration in which an external force acting in the axial direction onto the adjusting drive does not effect a relative rotation of the threaded spindle and the spindle nut, due to the friction prevailing in the thread, may be achieved by a relatively flat thread pitch, preferably with a single-start thread. As a result, a set adjustment position is automatically fixed relative to the forces acting during operation, without the use of further measures.

Alternatively, according to the invention, in an adjusting drive of the type mentioned in the introduction it may be provided that the external threaded spindle engages with its external thread in a drive nut, wherein the internal threaded spindle is able to be driven in rotation by the drive unit and is supported in the direction of the axis relative to the drive unit.

The internal threaded spindle in this embodiment is connected fixedly in terms of rotation to the drive unit for the rotating drive and is supported in the direction of the axis relative to the drive unit.

The internal threaded spindle which is able to be driven in rotation by the drive unit forms the second inner spindle drive, together with the internal thread of the external threaded spindle. As in the above-described first embodiment this may also be activated independently of the first spindle drive which is formed by the external threaded spindle and the drive nut. By rotating the internal threaded spindle relative to the internal thread, it is possible to displace the external threaded spindle in a linear manner in the direction of the axis, without the external threaded spindle being rotated relative to the drive nut. The first spindle drive is inactive and the drive nut is then entrained together with the external threaded spindle in a translational manner in the direction of the axis.

It is possible that the external threaded spindle is able to be driven in rotation by the internal threaded spindle relative to the drive nut, which is arranged fixedly in terms of rotation relative to the drive unit. As a result, the first outer spindle drive may be activated, which due to the rotatably driven external threaded spindle may be denoted as the rotary spindle drive. The drive unit together with the internal spindle is fixedly supported relative to a component of the steering column or the vehicle body, for example on a casing unit or a casing tube. The drive nut in this case is fixed in the direction of the axis to a component of the steering column which is adjustable in a translational manner thereto and fixed in rotation about the axis and in the direction of the axis, for example to a casing tube.

As the internal threaded spindle may penetrate and/or be screwed by the internal thread in the axial direction into the external threaded spindle, which is configured as hollow spindle, and the external threaded spindle in turn may be screwed through the drive nut, a usable free displacement path between the drive unit and the drive nut may be implemented, as in the first embodiment with the drive nut being connected fixedly in terms of rotation to the drive unit.

For activating the first spindle drive, the internal threaded spindle may be coupled in a rotationally fixed manner to the external threaded spindle. Preferably this may be implemented by a coupling device being configured between the internal threaded spindle and the external threaded spindle for the releasable rotationally fixed coupling of the internal threaded spindle to the external threaded spindle. By means of the activated coupling device, the internal threaded spindle may be coupled fixedly in terms of rotation relative to the internal thread. As a result, the second inner spindle drive, which is formed from the internal threaded spindle together with the internal thread, is deactivated and the external threaded spindle rotates in the case of the rotating drive of the internal threaded spindle together therewith. Thus the first spindle drive formed by the external threaded spindle and the drive nut is activated and a translational adjustment of the external threaded spindle relative to the drive nut is generated.

The invention further comprises a motor-adjustable steering column for a motor vehicle comprising an adjusting drive according to the invention, according to the above-described embodiments, which is arranged between casing tubes of a casing unit which are axially adjustable relative to one another telescopically and which bear the steering spindle and/or which is arranged between a support unit which is able to be connected to the body of the motor vehicle and a casing unit rotatably receiving a steering spindle. For implementing a longitudinal adjustment with a large adjustment path, for example with stowable steering columns for autonomous driving, the adjusting drive may be attached in parallel to the telescopable casing tube arrangement so that the spindle axis is parallel to the steering spindle axis. The casing tube arrangement may have two, three or more telescopically adjustable casing tubes, the adjusting drive with the drive unit and the internal spindle which is adjustable relative thereto in a linear manner being inserted therebetween. The drive nut is supported in the direction of the axis on one of the casing tubes and the free end of the internal spindle is supported on a further casing tube. A more compact structure may be advantageously implemented by the larger usable free adjustment path relative to the prior art. In this case, the separate activation of the spindle drives according to the invention permits the use of a smaller and more light-weight drive unit.

It is also conceivable and possible to configure the internal threaded spindle as a hollow threaded spindle, wherein the internal threaded spindle has a internal thread in which a further inner internal threaded spindle with an external thread, which may also have stop elements, is received and when the outer internal threaded spindle strikes with its stop element against the external threaded spindle, and thus the drive nut, the external threaded spindle and the internal threaded spindle rotate together synchronously with one another and the inner internal threaded spindle is fixed in terms of rotation relative thereto so that the inner internal threaded spindle moves in a translational manner relative to the drive nut, the external threaded spindle and the internal threaded spindle. Thus a multi-threaded spindle arrangement which comprises a third or further spindle drive may be provided.

Preferably the internal thread and the external thread are configured as movement threads, particularly preferably as trapezoidal threads. Alternatively, a metric ISO thread according to DIN 13 or a thread corresponding to the teaching of the German published patent application DE 10 2014 103 879 A1 may also be used.

It is equally possible for the vertical adjustment of a steering column to use an adjusting drive according to the invention which is supported on the vehicle body and a component of the steering column which is movable relative thereto in the vertical direction. This arrangement is particularly advantageous if large vertical adjustment paths are present. Otherwise it is possible to use a simple adjusting drive for the vertical adjustment and an adjusting drive according to the invention for the longitudinal adjustment.

Figure 2:
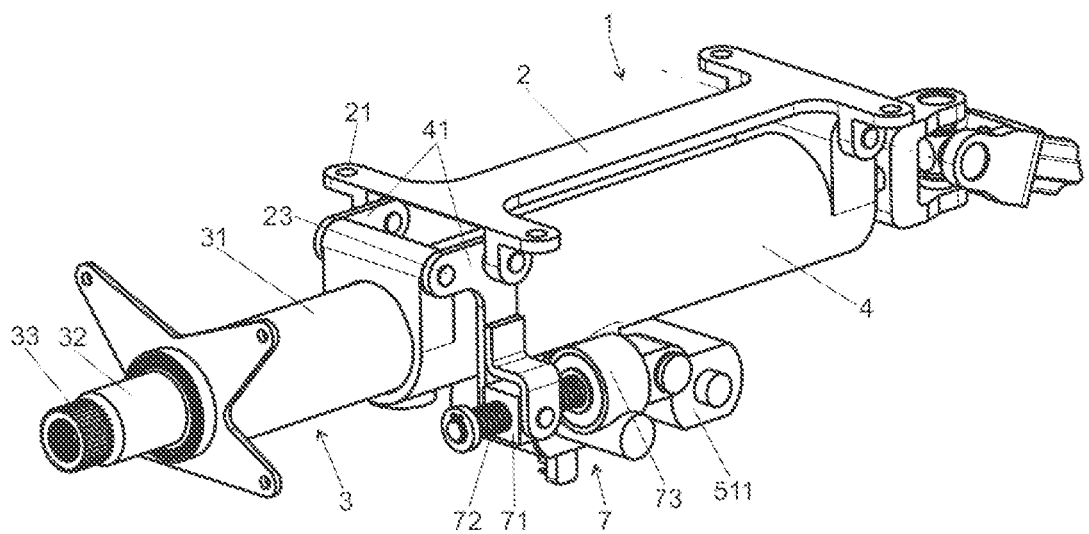
FIG. 2 is a further perspective view of the steering column according to FIG. 1 from a different viewing angle.
Figure 3:
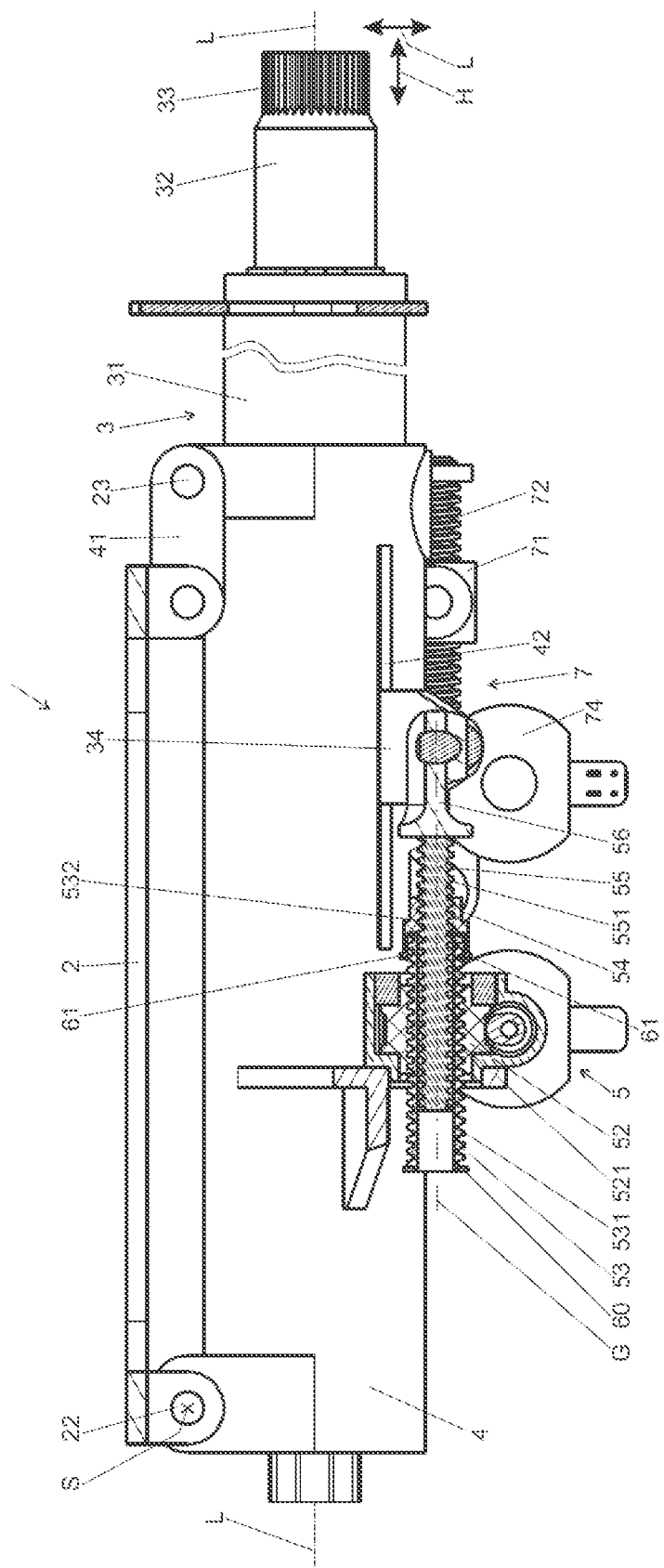
FIG. 3 is a side view of a steering column according to FIG. 1 or 2 with an adjusting drive in section along the spindle axis.

FIG. 1 shows a steering column 1 according to the invention in a schematic perspective view from top left obliquely to the rear end, relative to the direction of travel of a vehicle, not shown, where a steering wheel, not shown here, is held in the operating region. FIG. 2 shows the steering column 1 in a view from the opposing side, i.e. viewed from top right.

The steering column 1 comprises a support unit 2 which is configured as a bracket which has fastening means 21 in the form of fastening bores for attaching to a vehicle body, not shown. An actuating unit 3 which is received in a casing unit 4—also denoted as guide box or boxed swing arm—is held by the support unit 2.

The actuating unit 3 has a casing tube 31 in which a steering spindle 32 is rotatably mounted about a longitudinal axis (steering spindle axis) L, which extends axially in the zo longitudinal direction, i.e. in the direction of the longitudinal axis L. A fastening portion 33 is configured at the rear end on the steering spindle 32, a steering wheel, not shown, being able to be attached thereto.

A first adjusting drive 5 according to the invention for the telescopic longitudinal adjustment of the actuating unit 3 relative to the casing unit 4 in the direction of the longitudinal axis L has a drive unit 51 with an electric motor 511, by which a drive nut 52 is able to be driven in rotation about an axis G, i.e. the spindle axis. To this end a worm 512 which meshes with a toothing 513 configured on the drive wheel 52 and which is thus configured as a worm wheel of a reduction gear is connected to the motor 511.

The drive wheel 52 is rotatably mounted about the axis G in a bearing housing 514 and in the direction of the axis G fixedly supported on the casing unit 4. The axis G is located substantially parallel to the longitudinal axis L.

Enlarged views of the adjusting drive 5 in a sectional view along the axis G are shown in FIGS. 3, 4, 5, and 6.

An external threaded spindle 53, also denoted as the first threaded spindle, is screwed into the drive nut 52, i.e. it engages with its external thread 531 into the internal thread 521 of the drive nut 52. The drive nut 52 forms together with the external threaded spindle 53 a first spindle drive.

The external threaded spindle 53 has, in its end region facing away from the drive on the adjustment side, a threaded piece 54 which is connected in a pull-proof manner in the direction of the axis G and fixedly in terms of rotation to the external threaded spindle 53. For example, the threaded piece 54 is plastically compressed with a tubular or sleeve-shaped fastening attachment 533 on the external threaded spindle 53 and fixed in the axial and peripheral direction positively and non-positively thereby. In the threaded piece 54 the external threaded spindle 53 has an internal thread 532 coaxial to the axis G. An internal threaded spindle 55 engages with its external thread 551 in this internal thread 532 and is thus screwed into the internal thread 532. In this manner the internal thread 532 forms together with the internal threaded spindle 55 a second spindle drive.

In the free end or the adjustment side end facing away from the drive, a connecting element 56 is attached in a pull-proof manner and fixedly in terms of rotation to the internal threaded spindle 55 and is connected to a transmission element 34 fixedly attached to the actuating unit 3, and namely fixedly in the direction of the axis G and/or the longitudinal axis L and fixedly in terms of rotation relative to rotation about the axis G. In this manner, the adjusting drive 5 is supported via the internal threaded spindle 55 in the longitudinal direction on the casing tube 31.

The transmission element 34 extends from the actuating unit 3 through a slot 42 in the casing unit 4. For the telescopic adjustment of the steering column 1 in the longitudinal direction the transmission element 34 may be moved freely along the slot 42 in the longitudinal direction.

On the external threaded spindle 53 at its first end on the drive side—to the left in all of the figures—has a first stop element 60. The stop element 60 has a collar or projection protruding outwardly into the external thread 531, and thus may not be screwed through the internal thread 521 of the drive nut 52. Thus it forms a first end stop on the drive side for the linear spindle travel relative to the drive nut 52.

At its second end facing away from the drive and/or on the adjustment side end, the external threaded spindle 53 has a second stop element 61 which similar to the first stop element 60 has a collar or projection protruding outwardly into the external thread 531. Thus it forms a second end stop on the adjustment side for the linear spindle travel relative to the drive nut 52.

The second stop element 61, as shown in the embodiment shown in FIGS. 3 to 6, may be fixedly connected to a threaded piece 54 or configured in one piece therewith. Alternatively, as in the further embodiment according to FIG. 7, the second stop element may be fixed in a similar manner to the first stop element 60 as a collar or projection externally on the external thread 531.

The stop elements 60 and 61 form together with the drive nut 52 a coupling device which permits a releasable rotationally fixed coupling of the drive nut 52 with the external threaded spindle 53. This is described hereinafter with reference to FIGS. 4 to 6, which show the adjusting drive 5 in different adjustment positions.

Figure 4:
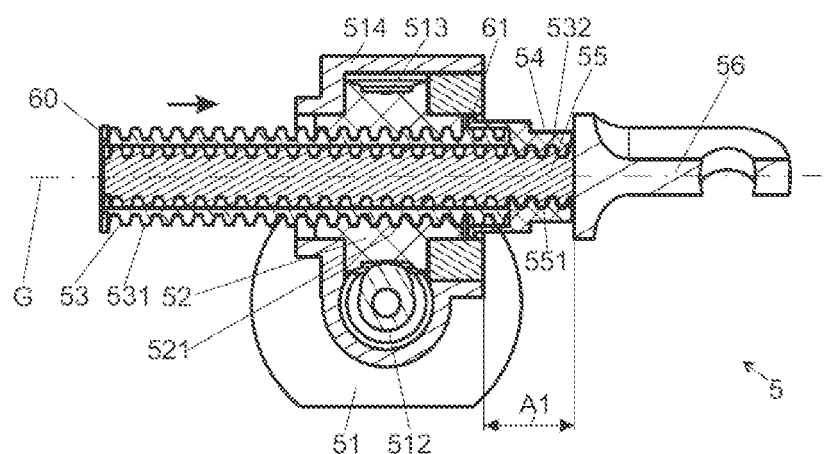
FIG. 4 is a longitudinal section of the adjusting drive according to FIG. 3 in the retracted adjustment position (retracted position).

FIG. 4 shows the adjusting drive 5 in an approximately maximum shortened state. Measured from the drive unit 51, the connecting element 56 has the shortest adjustable distance A1. If the drive nut 52 is set in rotation relative to the external threaded spindle 53 by the drive unit 51, the first spindle drive functions as a plunger spindle drive and the external threaded spindle 53 moves in the direction of the axis G in the adjusting direction in a linear manner relative to the drive nut 52 as indicated by the arrow—to the right in the view of FIG. 4. In this case the internal threaded spindle 55, engaging in the internal thread 532 of the external threaded spindle 53, is moved in a linear manner with the external threaded spindle 53, wherein no relative twisting takes place between the internal threaded spindle 55 and the external threaded spindle 53, in other words this second spindle drive is still out of operation and/or deactivated until the intermediate position shown in FIG. 5 is reached.

Figure 5:
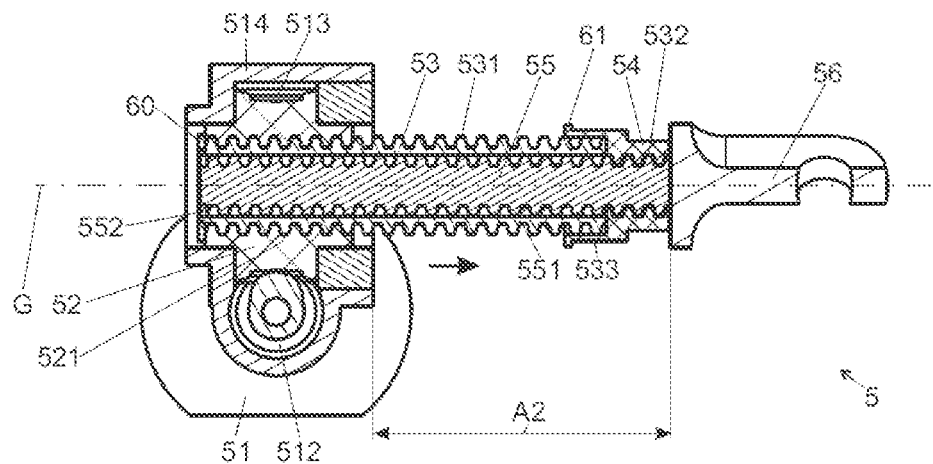
FIG. 5 is a longitudinal section of the adjusting drive according to FIG. 4 in the partially extend-ed adjustment position (intermediate position).

In the intermediate position shown in FIG. 5 the external threaded spindle 53 is extended to a maximum extent in the adjustment direction—to the right in the drawing—out of the drive nut 52. Measured from the drive unit 51, the connecting element 56 has an average adjustable distance A2 which is greater than the distance A1. The stop element 60 strikes on the front face—from the left in the drawing—against the drive nut 52 and thereby blocks the further rotation of the drive nut 52 relative to the external threaded spindle 53. By the coupling device formed from the stop element 60 in cooperation with the drive nut 52, the external threaded spindle 53 is now coupled fixedly in terms of rotation, at least in the previously performed rotational direction, to the drive nut 52, and the first spindle drive is deactivated.

Figure 6:
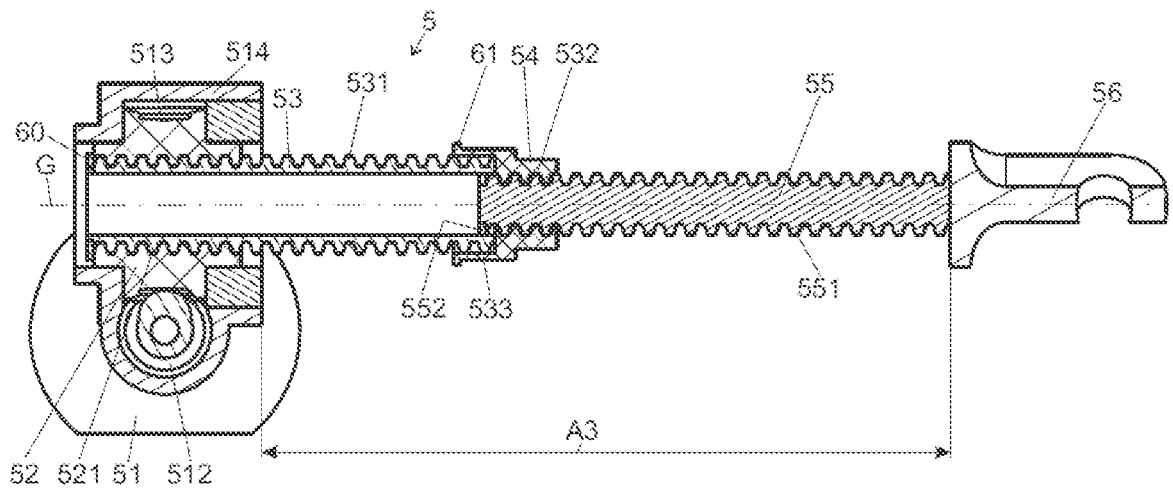
FIG. 6 is a longitudinal section of the adjusting drive according to FIG. 4 in the fully extended adjustment position (extended position).

By means of the further drive, the drive nut 52 together with the external threaded spindle 53 is rotatably driven about the axis G. These components thus rotate synchronously together. Thus the internal thread 532 connected to the external threaded spindle 53 is set in rotation relative to the internal threaded spindle 55 which is fixed in rotation relative to the axis G. As a result, the second spindle drive, formed by the internal thread 532 together with the internal threaded spindle 55, is activated and the internal threaded spindle 55 is moved away from the drive nut 52 out of the external threaded spindle 53 as indicated in FIG. 5 by the arrow, until the maximum extended adjustment position shown in FIG. 6 is reached. Measured from the drive unit 51 the connecting element 56 has the greatest adjustable distance A3 therein.

For the retraction, the drive nut 52 is driven in the reverse rotational direction. As a result, starting from the state shown in FIG. 6, initially the stop element 60—to the left in the drawing—is moved away from the drive nut 52 and the first spindle drive is activated. The drive nut 52 rotates relative to the external threaded spindle 53 so that this external threaded spindle is moved in a linear manner toward the drive nut 52 and penetrates therein until the stop element 61 on the front face strikes against the drive nut 52. The stop element thus forms together with the drive nut 52 a coupling device which couples the drive nut 52—this time in the reverse rotational direction—to the external threaded spindle 53 fixedly in rotation. By the further rotation the second inner spindle drive is activated and the internal threaded spindle 55 is moved in a linear manner relative to the internal thread 532 until it once again penetrates the external threaded spindle 53, as shown in FIG. 4.

Alternatively, during the retraction, initially the drive nut 52 together with the external threaded spindle 52 may be rotatably driven, whereby the internal threaded spindle 55 is moved in a linear manner relative to the internal thread 532 until the internal threaded spindle 55 again penetrates the external threaded spindle 53, as shown in FIG. 5. Thus, during the retraction, initially the second spindle drive is activated and the first spindle drive is deactivated. As soon as the internal threaded spindle 55 is fully screwed into the external threaded spindle 52, the switching takes place by further rotation due to the coupling device, wherein the second spindle drive is deactivated and the first spindle drive is activated. The drive nut 52 then rotates relative to the external threaded spindle 53 so that this external threaded spindle is moved in a linear manner toward the drive nut 52 and penetrates therein until the stop element 61 on the front face lies against the drive nut 52.

A stop element 552 which protrudes into the external thread 551 and may not be screwed through the internal thread 532 may be configured or attached at the drive-side end of the internal threaded spindle 55. As a result, the stop element 552 forms an end stop which secures the internal threaded spindle 55 against removal from the internal thread 532.

The external threaded spindle 53 and the internal threaded spindle 55 may be produced from steel. The threaded piece 54 and/or the drive nut 52 may be formed at least in the region of the internal thread 521 and/or 532 from non-ferrous metal or plastics.

Figure 7:
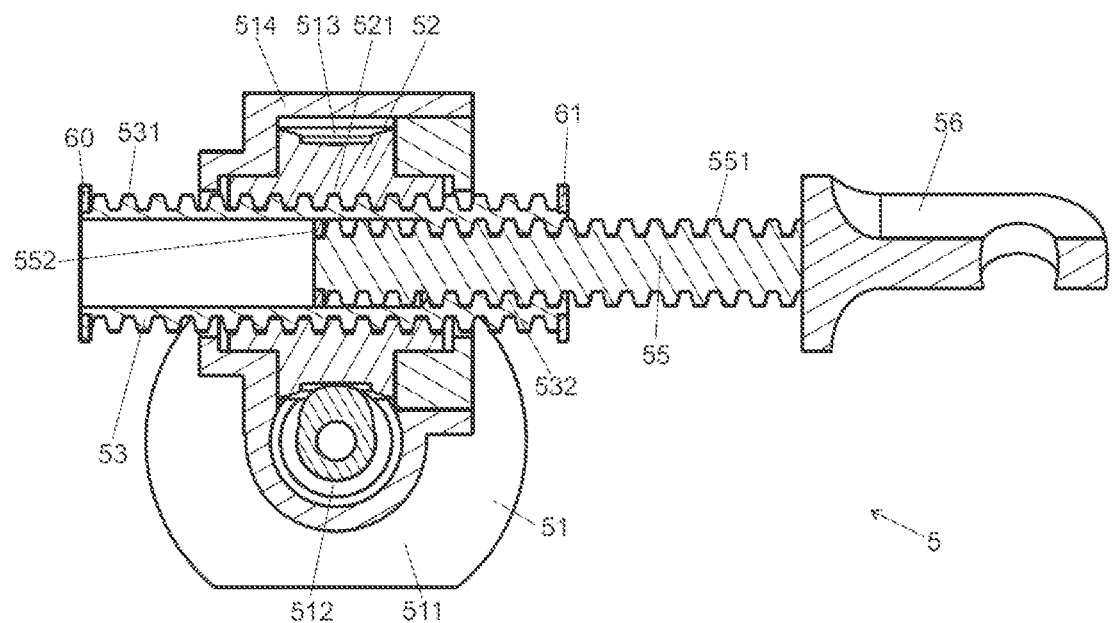
FIG. 7 is a longitudinal section of an embodiment of an adjusting drive in a view similar to FIG. 5.

In the embodiment shown in FIG. 7, the internal thread 532 is configured in one piece, preferably integrally in one piece in the external threaded spindle 53. As a result, a separately attached threaded piece 54 is not present. The second stop element 61 may then be configured in a similar manner to the first stop element 61 as a projection or collar which is attached externally to the external thread and which blocks a through passage of the drive nut 52 through the internal thread 521.

Figure 8:
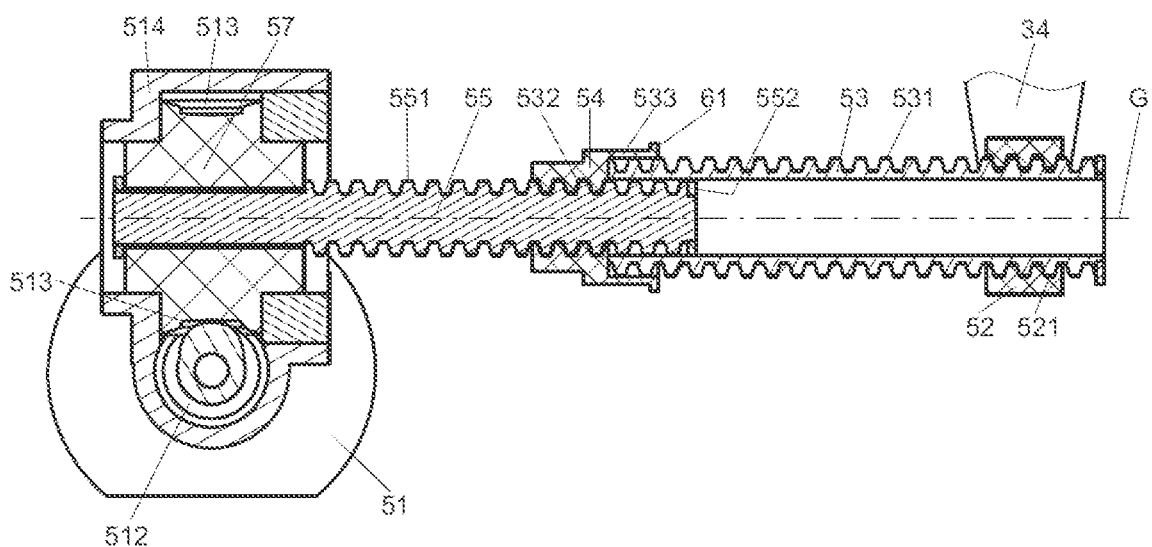
FIG. 8 is a longitudinal section of an embodiment of an adjusting drive in longitudinal section.

FIG. 8 shows in a view similar to FIG. 6 an alternative embodiment of an adjusting drive 5, wherein the same reference numerals are used for similar acting parts. In contrast to the first embodiment, the internal threaded spindle 55 is connected fixedly in terms of rotation and fixedly in the direction of the axis G to a gearwheel 57, which as in FIG. 6 the drive nut 52 is able to be driven in rotation by the drive unit 51 about the axis G relative to the steering column. The drive nut 52 is supported fixedly in terms of rotation about the axis G and fixedly supported in the direction of the axis G on a transmission element 34, which is attached to a casing tube 31 which is adjustable relative to the drive unit 51. The internal threaded spindle 55 has an external thread 551 which is in engagement with the internal thread 532 of the threaded piece 54 of the external threaded spindle 53. Thus the second (internal) spindle drive is formed by the external thread of the internal threaded spindle 55 and the internal thread 532 of the threaded piece 54 of the external threaded spindle 53. The drive nut 52 has an internal thread 521, wherein the external thread 531 of the external threaded spindle 53 engages in the internal thread 521 and forms the first (outer) spindle drive.

The internal threaded spindle 55 has on its free end facing away from the drive unit 51 a stop element 552 which may be configured in a similar manner to a stop element 60 or 61. As described for the first embodiment, this stop element 552 may not be screwed through the internal thread 532 of the threaded piece 54. When the external threaded spindle 53 is moved relative to the internal threaded spindle 55 by a relative translational adjustment—to the right in the drawings—in which the internal threaded spindle 55 is rotatably driven by the drive unit 52, the stop element 552 strikes against the stop piece 54, which is coupled thereby fixedly in terms of rotation to the internal threaded spindle 55. The inner spindle drive is deactivated thereby. The external threaded spindle 53 is now rotatably driven via the threaded piece 54 by the internal threaded spindle 55, and the first outer spindle drive is activated, wherein the internal threaded spindle 55 and the external threaded spindle may be driven together and synchronously by the drive unit. In this case, the external threaded spindle 53 rotates relative to the drive nut 52 so that a translational relative movement is generated.

By the cooperation of the stop element 552 with the internal thread 532, a coupling device is formed, the internal threaded spindle 55 optionally being able to be coupled thereby in a torque-transmitting manner to the external threaded spindle 53. As in the first embodiment it is possible to drive the first spindle drive independently of the second threaded drive, so that the advantages according to the invention may be implemented.

For the vertical adjustment, the casing unit 4 may be pivotably mounted in a pivot bearing 22 on the support unit 2 about a horizontal pivot axis S located transversely to the longitudinal axis L. In the front region, the casing unit 4 is connected via an actuating lever 41 to the support unit 2. By a rotational movement of the actuating lever 41 by means of an actuating drive 6 (see FIGS. 2 and 3) the casing unit 4 may be pivoted relative to the support unit 2 about the pivot axis S located horizontally in the installed state, whereby an adjustment of a steering wheel attached to the fastening portion 33 may be undertaken in the vertical direction H, which is indicated by the double arrow.

In FIG. 2 it may be identified how a second adjusting drive 7 is attached to the steering column 1 for the adjustment in the vertical direction H. This adjusting drive 7 is configured in the example as a simple rotary spindle drive and comprises a spindle nut 71 into which a threaded spindle 72 engages. The threaded spindle 72 is supported in a bearing housing 73 on the casing unit 4 and is optionally able to be driven in rotation in both rotational directions by an electric servomotor 74.

The spindle nut 71 is fixedly attached, relative to a rotation about its axis, to one end of the two-arm actuating lever 41 which is rotatably mounted on the support unit 22 about a pivot bearing 23, the other arm thereof being connected at the other end to the casing unit 4.

By rotating the threaded spindle 71—depending on the rotational direction of the actuating motor 74—the spindle nut 71 may be displaced in a translational manner in the direction of the axis G relative to the threaded spindle 72, so that correspondingly the casing unit 4 which is connected via the actuating lever 41 to the spindle nut 71, together with the actuating device 3 received therein, may be adjusted up or down relative to the support unit 2 in the vertical direction H as indicated by the double arrow.

Alternatively, the adjusting drive 7 may also be configured as an adjusting drive 5 according to the invention.

LIST OF REFERENCE NUMERALS

1 Steering column
2 Support unit
21 Fastening means
22 Pivot bearing
23 Pivot bearing
3 Actuating unit
31 Casing tube
32 Steering spindle
33 Fastening portion
34 Transmission element
4 Casing unit
41 Actuating lever
42 Slot
5 Adjusting drive
51 Drive unit
511 Motor
512 Worm
513 Toothing
514 Bearing housing
52 Drive nut
521 Internal thread
53 External threaded spindle
531 External thread
532 Internal thread
533 Fastening attachment
54 Threaded piece
55 Internal threaded spindle
551 External thread
552 Stop element
56 Connecting element
57 Gearwheel
60, 61 Stop element
7 Adjusting drive
71 Spindle nut
72 Threaded spindle
73 Bearing housing
74 Motor
L Longitudinal axis
G Axis (spindle axis)
S Pivot axis

What is claimed is:

1. An adjusting drive for a motor-adjustable steering column for a motor vehicle, comprising:
   a motorized drive unit;
   an external threaded spindle which has an external thread and a coaxial internal thread;
   an internal threaded spindle disposed within the external threaded spindle and engaged with the coaxial internal thread;
   wherein the external threaded spindle and the internal threaded spindle are configured to be driven in rotation relative to one another about an axis by the drive unit;
   wherein the external threaded spindle engages with its external thread in a drive nut, wherein the drive nut or the internal threaded spindle is configured to be driven in rotation by the drive unit and is supported relative to the drive unit in the direction of the axis.

2. The adjusting drive of claim 1, further comprising a coupling device configured between the external threaded spindle and the drive nut, configured to releasably and rotationally fix the external threaded spindle to the drive nut.

3. The adjusting drive of claim 2 wherein the coupling device has at least one stop element which is fixedly attached to the external threaded spindle and which is configured to be supported in the direction of the axis against the drive unit.

4. The adjusting drive of claim 3, further comprising a stop element disposed in an end region of and externally on the external threaded spindle and which is configured to be supported against the drive nut.

5. The adjusting drive of claim 1 wherein the internal thread and the external threaded spindle are a one piece construction.

6. The adjusting drive of claim 1 wherein the internal thread is a threaded piece connected to the external threaded spindle.

7. The adjusting drive of claim 6 wherein the threaded piece has a coupling device.

8. The adjusting drive of claim 1 wherein the external threaded spindle and the internal threaded spindle have equal thread pitches.

9. The adjusting drive of claim 1 wherein the external threaded spindle and the internal threaded spindle have different thread pitches.

10. The adjusting drive of claim 1 wherein the first spindle drive formed by the drive nut and the external threaded spindle and/or the second spindle drive formed by the external threaded spindle and the internal threaded spindle are configured to be self-locking.

11. The adjusting drive of claim 1, further comprising a coupling device disposed between the internal threaded spindle and the external threaded spindle and configured to releasably, rotationally fix the internal threaded spindle to the external threaded spindle.

12. The adjusting drive of claim 11 wherein the coupling device has at least one stop element which is fixedly attached to the internal threaded spindle and which is configured to be supported in the direction of the axis against the external threaded spindle.

13. The adjusting drive of claim 12, further comprising a stop element disposed in an end region of and externally on the internal threaded spindle and configured to be supported in the direction of the axis against the internal thread.

14. A motor-adjustable steering column for a motor vehicle comprising:
an adjusting drive comprising:
a motorized drive unit;
an external threaded spindle which has an external thread and a coaxial internal thread; and
an internal threaded spindle disposed within the external threaded spindle and engaged with the coaxial internal thread;
wherein the external threaded spindle and the internal threaded spindle are configured to be driven in rotation relative to one another about an axis by the drive unit;
wherein the external threaded spindle engages with its external thread in a drive nut, wherein the drive nut or the internal threaded spindle is configured to be driven in rotation by the drive unit and is supported relative to the drive unit in the direction of the axis; and
wherein the motorized drive is arranged between casing tubes of a casing unit which are axially adjustable relative to one another telescopically and which bear a steering spindle and/or which is arranged between a support unit which is able to be connected to the motor vehicle and a casing unit rotatably receiving a steering spindle.

* * * * *